US006103159A

United States Patent [19]

Schütze et al.

[11] Patent Number: 6,103,159

[45] Date of Patent: Aug. 15, 2000

[54] METHOD FOR PREVENTING MATERIAL TO BE BRIQUETTED FROM STICKING TO A ROLL SURFACE

[75] Inventors: Wolfgang Schütze; Werner Plagemann, both of Bochum; Siegfried Gröne, Witten, all of Germany

[73] Assignee: Maschinenfabrik Koppern GmbH & Co. KG, Hattingen, Germany

[21] Appl. No.: 09/118,724

[22] Filed: Jul. 17, 1998

[30] Foreign Application Priority Data

Jul. 24, 1997 [DE] Germany ........................... 197 31 975

[51] Int. Cl.[7] ........................... B29C 33/58; B29C 43/08

[52] U.S. Cl. .......................... 264/109; 264/121; 264/338; 425/579; 419/69

[58] Field of Search .................................... 264/242, 264, 264/130, 104, 109, 112, 113, 121, 39, 119, 338; 425/78, 79, 579; 419/61, 69

[56] References Cited

U.S. PATENT DOCUMENTS

| | | | |
|---|---|---|---|
| 3,414,643 | 12/1968 | Collie | 264/109 |
| 4,071,595 | 1/1978 | Komarek et al. | 264/125 |
| 4,173,610 | 11/1979 | Huller et al. | 264/109 |
| 4,889,555 | 12/1989 | Szekely et al. | 264/125 |
| 5,049,333 | 9/1991 | Wolfe et al. | 264/109 |
| 5,935,496 | 8/1999 | Waatti | 264/113 |

FOREIGN PATENT DOCUMENTS

3507166 A1 9/1986 Germany .

*Primary Examiner*—Angela Ortiz
*Attorney, Agent, or Firm*—Fields and Johnson, P.C.

[57] ABSTRACT

The present invention relates to a method for preventing material to be briquetted from sticking to a roll surface of a briquetting roll press. To be more specific, a sticking of the material to be briquetted to and a sintering of the material on the roll surface are to be prevented. To this end, a lubricant emulsion which is atomized with a gas is sprayed onto the roll surface.

32 Claims, 4 Drawing Sheets

METHOD FOR PREVENTING MATERIAL TO BE BRIQUETTED FROM STICKING TO A ROLL SURFACE

TECHNICAL FIELD

The present invention relates to a method for preventing material to be briquetted from sticking to a roll surface of a briquetting roll press.

BACKGROUND OF THE INVENTION

In particular during hot briquetting with a roll press, some of the materials to be briquetted (for instance sponge iron) tend to stick to the roll surface or inside the molding pockets. It is true that the material to be briquetted first leaves the rolls as a continuous strip. The latter, however, sticks to the surface of a press roll and is deflected, thereby blocking the briquetting press in the end. Another drawback arising during briquetting is that fine-grained material is sintered on the roll surface due to a high pressing power and high temperatures, whereby the process sequence may also be disturbed. Furthermore, the roll surfaces wear in a disadvantageous manner. Sooner or later such problems will automatically lead to standstills in the installations, entailing corresponding costs. An apparatus for making briquettes from sponge iron is described in DE 35 07 166 A1.

It is already known in the case of briquetting roll presses that dry graphite powder is made to trickle onto the roll surface by means of a vibration feeder which is arranged above the press rolls and by means of a metering operation which is performed by a screw conveyor. It is true that there is already an improvement thanks to the use of graphite powder as the lubricant. However, there are ensuing disadvantages, in particular, because of the fact that the lubricant is distributed over the roll surface in a rather non-uniform manner and that the lubricant has relatively poor adhesion characteristics, so that considerable amounts are lost because of trickling. Since very hot materials are often processed by the briquetting roll press, there is a corresponding thermal current above the press rolls, whereby a considerable part of the graphite powder which is trickling down because of gravity does not at all reach the roll surface, but is directly discharged by exhaust air or suction to the outside. Hence, the use of such a dry lubricant for the above-mentioned purpose constitutes a considerable cost factor because the losses are relatively high. The graphite inside the exhaust air is deposited in a negative manner. For instance, the installations are coated with a black graphite film.

The generic U.S. Pat. No. 3,414,643 describes an apparatus for briquetting fine calcium oxide. The apparatus comprises rotating briquetting rolls whose surface is provided with molding pockets and is wetted by means of a nozzle device with an emulsion consisting essentially of water and a polyoxyethylated alkyl phenol. The briquettes are thereby meant to fall out of the molding pockets in an improved manner. However, this document does not show a method how the lubricant could be used more efficiently.

BRIEF SUMMARY OF THE INVENTION

It is therefore the object of the present invention to provide a method of the above-mentioned type in which a sticking of the material to be briquetted is prevented in an efficient and inexpensive manner, and also the sintering of fine material, and wear is reduced.

According to the invention this object is achieved in the method by the measure that the lubricant emulsion is sprayed onto the roll surface in being atomized with a gas.

Although lubricant emulsions as such are already known in the prior art and their use in the field of die forging for preventing the forged parts from sticking within the press has already been described, such discontinuous methods cannot be transferred to a method employing a briquetting roll press. As for die forging, it is important that the lubricant is applied within a period of time that is as short as possible and in a discontinuous manner, i.e., the throughput is very high. The aim is to prevent not only the briquette strip from sticking to the roll surface or within the molding pockets, but sintering of fine-grained material to be briquetted is also to be avoided on the roll surface. It could not be expected right away that atomizing a lubricant emulsion and introducing the spray into the dusty hot region of a roll press would entail such advantages. However, it has been found that considerable amounts of lubricants can be saved by way of such a procedure because the emulsion has a considerably improved tendency to stick to the roll surface. Thanks to the spraying of the lubricant emulsion which is atomized by the gas, it is ensured that despite the thermal current in the hot region of the roll press the lubricant passes safely and almost entirely to the roll surface. The lubricant emulsion can be introduced in amounts so small that the briquetting operation is not impaired, but wear of the roll surface is even reduced. A selective uniform distribution of the lubricant on the roll surface can also be carried out with the method, in particular by distributing applying means, in particular nozzles. As a result, the loss of lubricant is considerably reduced, and the environmental load is thereby decreased. The costs for the lubricant to be applied are reduced. A temperature shock during hot briquetting due to an excessively large amount of water of the lubricant emulsion can be avoided by atomizing the lubricant emulsion.

The lubricant emulsion which is atomized with gas can preferably be sprayed at a speed sufficient to break through a vapor barrier existing in the roll region. A vapor barrier builds up, in particular, during hot briquetting in that the water evaporates in the lubricant emulsion and is normally discharged upwards. The gas must accelerate the lubricant emulsion accordingly, so that the gas/emulsion mixture still impinges on the roll surface with a sufficient impact despite the vapor barrier. Such adverse conditions need not be expected in the case of cold briquetting.

A graphite powder emulsion is preferably used as the lubricant emulsion because this emulsion is particularly suited for use at high temperatures and shows advantageous cost effectiveness. Although the use of other temperature-resistant lubricants is possible, these entail increased costs most of the time.

The lubricant emulsion advantageously contains 50% to 90% of water and 10% to 50% of graphite powder. Tests have shown that there is rather a tendency towards smaller percentages of graphite powder and that there is, nevertheless, a sufficiently positive effect.

When binders, in particular, are added to the lubricant emulsion to keep the graphite powder essentially uniformly distributed in the water, a uniform distribution of the lubricant on the roll surface is thus promoted in such an embodiment. Even if the emulsion has been stored for a long period of time, the graphite powder will not deposit, provided a suitable binder has been used. Adhesion to the roll surface can also be reduced by suitably selecting a binder.

It is recommended for the briquetting of pyrophorous material that there should not be a reaction with oxygen. That is why an inert gas can advantageously be used as the gas. Oxygen-reduced gas mixtures are also used as the inert gas.

To avoid clogging of the nozzles as much as possible in the relatively dirty hot chamber of the roll press, and also an impairment of the atomizing action, the lubricant emulsion is atomized with the gas preferably outside of a hot region directly surrounding the press rolls. Most of the time, the press rolls are surrounded at some distance by a hood which encompasses this considerably soiled hot region. Hence, the term "directly" also covers this enclosed chamber. Hence, outside the hot region, the temperature is already considerably reduced in comparison with the temperature of the roll surface and with the temperature inside the hood.

The method can be carried out in a simple installation by performing a joint atomizing operation for various nozzle exits. Hence, just a single atomizing means is needed for providing a corresponding emulsion/gas mixture which is then discharged through various nozzles. It is also possible to provide each of the press rolls with an atomizing device of its own.

In one embodiment it is of special advantage when 0.1 up to 0.3 l/min lubricant emulsion mixed with gas is sprayed onto each press roll. This means relatively small amounts, in particular in comparison with a dry trickling of graphite powder.

The method of the invention can primarily be employed when hot sponge iron is briquetted as the material to be briquetted. Hot sponge iron, in particular, tends to have the above-described drawbacks, such as sticking to and sintering on the roll surface and the resulting increased wear.

Protection is hereinafter sought for a briquetting roll press for briquetting, in particular, hot material to be briquetted, the press comprising a pair of briquetting rolls and nozzle means assigned to the briquetting rolls for spraying a lubricant emulsion, and means for applying lubricant onto the surface of the briquetting rolls. This briquetting roll press is characterized according to the invention in that an atomizing device is assigned to the nozzle means for atomizing lubricant emulsion with gas.

Hence, no mechanically moved parts, such as a screw conveyor, are needed. There are just simple nozzles which ensure the desired lubricating effect, resulting in a simplified construction together with the desired reduction of costs. The amount of lubricant can be reduced by using the atomizing device for atomizing the lubricant emulsion with gas.

Furthermore, the press rolls can be shielded to the outside at least in portions by a hood means surrounding the rolls at some distance, with the hot region which directly surrounds the press rolls being located inside the hood means and an atomizing means being assigned to the hot region for atomizing lubricant emulsion with gas. The emulsion/gas mixture is introduced into the hot region at a relatively high speed due to the assignment of the atomizing means to the hot region, whereby efficiency becomes very high.

It is also possible to arrange the atomizing device outside the hot region. This prevents a clogging of the atomizing means caused by excessively great thermal action. Atomization is normally carried out at an increased gas speed. However, it is normally desired that the atomized lubricant emulsion is introduced at a speed which is as low as possible. Since the emulsion/gas mixture has still to cover a certain distance downstream of the atomizing means, a speed reduction is very easily possible.

Advantageously, the nozzle means comprise nozzle tubes with a large flow cross-section, preferably greater than 5 $mm^2$, for producing a slow flow rate, with the aim to achieve a small impact speed on the roll for avoiding rebound as well as clogging of the nozzle means. Tubes with a large cross-section as such do not tend to clog and, in addition, can be cleaned very easily. A complicated nozzle structure can thus be dispensed with, whereby an arrangement in the soiled hot region is easily possible.

An effective atomizing operation can be performed by providing a venturi tube in which the gas can be accelerated and the lubricant emulsion can be supplied in metered amounts. Such an atomization is well known in the prior art, resulting in different possibilities of positioning the supply points of the lubricant flow. In the final analysis, these depend on the atomizing effect intended.

Furthermore, there may be provided a tubing for supplying the lubricant emulsion to the venturi tube, the tubing comprising flushing means for flushing the tubing (for instance flushing at an increased pressure). As a result, a self-cleaning operation of the atomizing means and the nozzle means may sometimes take place, whereby maintenance work is reduced.

Another possibility of designing the nozzle means is that the means is designed as a direct injection means which supplies the lubricant at the side to the gas flow. For specific applications, it is entirely sufficient when the lubricant emulsion is introduced into the constant gas flow at the side. A fine distribution of the lubricant emulsion in drops is then carried out due to the entrainment effect.

However, it is also possible to provide a combination of direct injection means and venturi nozzle as the nozzle means. The emulsion/gas mixture exiting from the direct injection means is then preferably once again atomized at an accelerated gas flow rate.

In a further embodiment, a plurality of nozzles are assigned to a roll press, with a single atomizing means being provided for each roll press or roll for jointly feeding the associated nozzles. Atomization may be carried out without any problems for all nozzles or the nozzles of a press roll in a joint manner, whereby the whole lubricant supply means can considerably be simplified and costs can be saved.

BRIEF DESCRIPTION OF THE DRAWINGS

Embodiments of the present invention shall now be explained with reference to a drawing, in which.

DETAILED DESCRIPTION OF THE INVENTION

Figure 1:
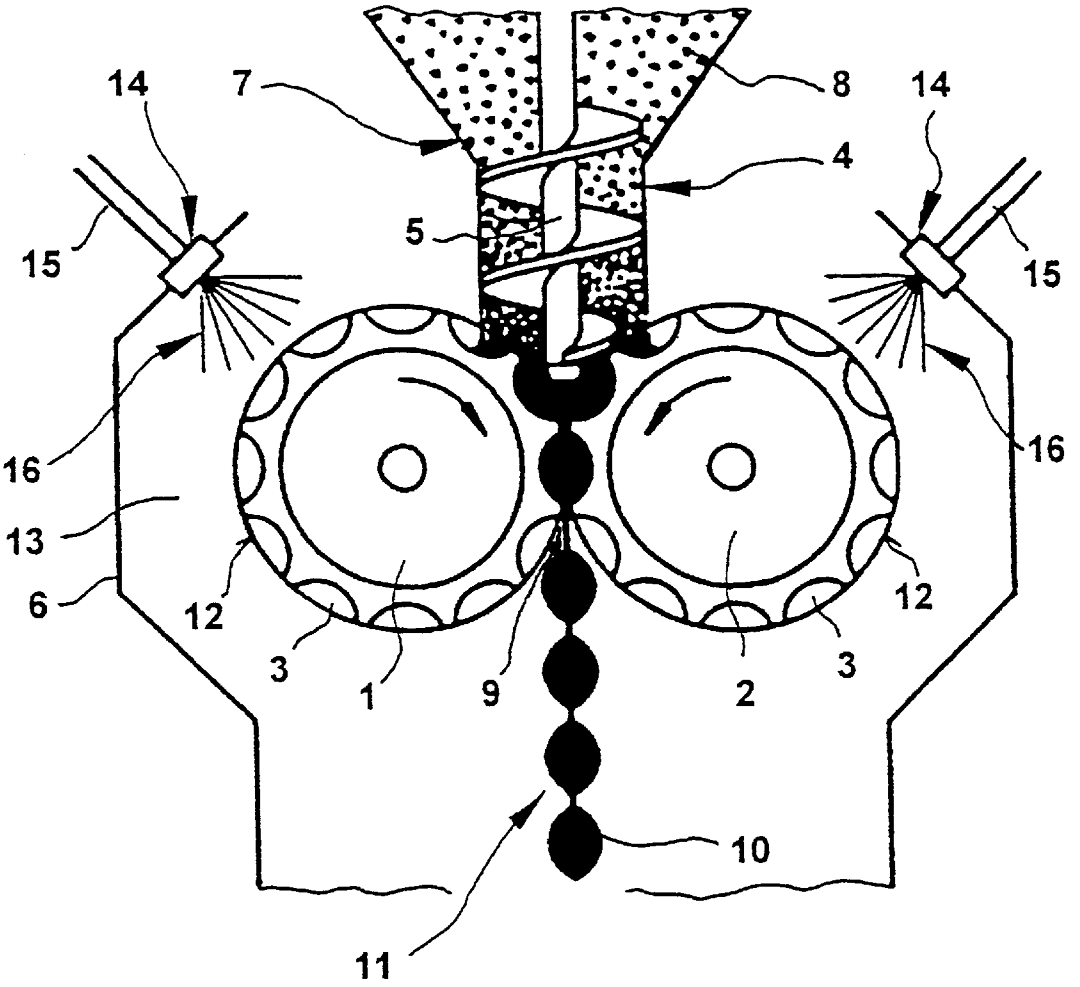
FIG. 1 is a schematic side view of a briquetting roll press of the invention.

The briquetting roll press illustrated in FIG. 1 essentially comprises two cylindrical press rolls 1, 2 with molding pockets, a feed means 4 in the form of a screw feeder with screw 5, and a hood means 6 surrounding the pair of rolls in sections and at some distance.

Material 8 which must be briquetted, in the present case sponge iron, is fed in a hot state via the feed hopper 7 pertaining to the feed device 4, and is precompacted by the screw 5 (feeding by gravity is also possible). The feed hopper 7 and the screw 5 are arranged such that the material 8 to be briquetted is filled into a nip 9 of the press rolls 1 and 2 which are arranged in parallel with one another and rotate in opposite directions. In the nip 9, the material 8 which is to be briquetted is then pressed by the molding pockets 3 into briquettes 10 or into a continuous briquette strip 11.

The space between surfaces 12 of the press rolls 1 and 2 and the hood means 6 can be designated as a hot region 13 in which an elevated temperature and an increased degree of dirt can be observed. Exhaust air and dusts are discharged from the hood means 6. Dusts may unintentionally escape through gaps, labyrinths, etc.

Sponge iron 8, in particular, tends to stick to the roll surface 12 and to the surfaces of the molding pocket 3, so that there is the risk that the briquette strip 11 will not exit in the ideal manner drawn in FIG. 1. Furthermore, sponge iron tends to sinter on the roll surface 12 and the surfaces of the molding pockets 3.

The roll surfaces 12 and thus the surfaces of the molding pockets 3 are sprayed by a nozzle means 14 which penetrates through the hood means 6 and is supplied via a tube 15 with a lubricant/gas mixture 16. This lubricant/gas mixture 16 wets the roll surface 12, including the molding pockets 3, and ensures that the sponge iron 8 does not stick to the molding pockets 3 and does not sinter on the roll surface 12. The spraying speed is selected for the lubricant/gas mixture 16 such that the thermal current prevailing inside the hood means 6 is overcome and an amount of the lubricant/gas mixture 16 that is as great as possible impinges on the roll surface 12. However, the spraying speed is only so great that as little material as possible is reflected and clogging of the nozzle means 12 caused by the high temperatures prevailing in the hot region 13 is prevented. Spraying by means of the nozzle means 14 is preferably carried out in the upper half of the press rolls 1 and 2 shortly before the further rotation of said rolls towards the nip 9. Hence, there is a continuous wetting operation of the rotating press rolls 1 and 2.

A plurality of nozzle means 14 may be distributed over the length of the press rolls 1, 2, and a joint atomization of the lubricant/gas mixture 16 outside the hot region 13 may take place and the lubricant/gas mixture 16 is then passed through tubes 15 to the individual nozzle means 14.

Figure 2:
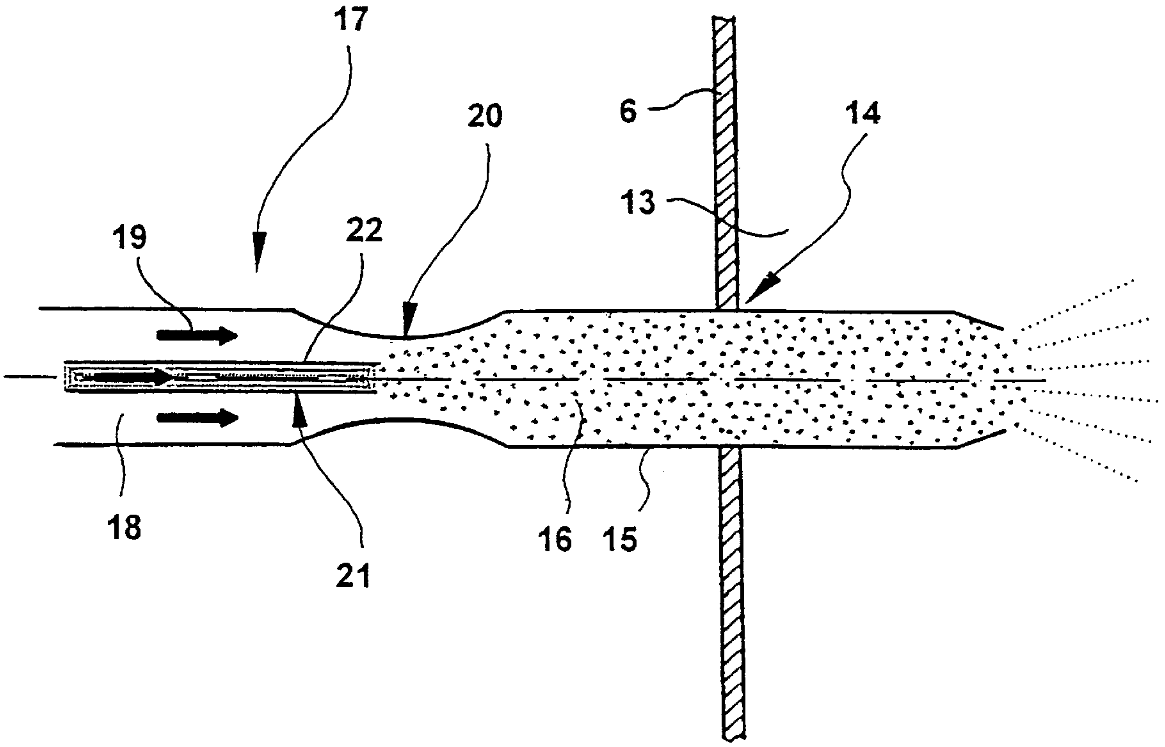
FIG. 2 schematically illustrates a variant of an atomizing device.

An embodiment of a nozzle means 14 with an upstream atomizing device 17 shall now be described in more detail with reference to FIG. 2.

Gas, in the present case an inert gas 19, is supplied to a venturi tube 20 via a tube system 18. The cross sections as well as the gas pressure are dimensioned such that a minimum amount of lubricant and inert gas is consumed at an optimum efficiency factor. Within the venturi tube 20, a lubricant emulsion 22 is introduced in metered amounts via a tubing 21 for atomizing purposes. As for lubricant emulsions 22, a mixture of graphite powder and water is preferably used with addition of specific binders. The mixing ratio of water and graphite powder is about 7:3. The binders ensure that the graphite powder is evenly distributed in the water and does not deposit, if possible. At the same time, the binders ensure improved adhesion to the roll surface 12.

The atomized lubricant/gas mixture 16 is then supplied to the nozzle means 14 via a tube 15, the nozzle means 14 being just an extension of the tube 15 in a preferred embodiment. As a result, a diameter which is as large as possible is provided for, whereby the nozzle means 14 shows hardly any tendency to clog and can be cleaned very easily.

It is also possible to rinse the tubing 21 under pressure, which also results in a cleaning effect. The tubing 21 already terminates in the area of the venturi tube 20. The inert gas 19 is supplied to the venturi tube 20 at a relatively slow gas flow speed, the gas being accelerated by the constriction in the venturi tube 20, thereby entraining the lubricant emulsion 22 from the tubing 21. Downstream of the venturi tube 20, the lubricant/gas mixture 16 is again braked, so that there is just the necessary flow velocity. The risk of reflecting material (rebound) is largely excluded by the use of speeds that are as small as possible. Nozzle means 14 of such a simple type including atomizing devices 17 located outside the hot region 13 ensure that the nozzle means 14 also function under the rough conditions prevailing in the hot region, with hardly any maintenance work.

Thanks to the nozzle device 14, the lubricant can be distributed over the roll surface 12 in a selective and even manner. An adequate adhesion to the roll surface 12 is, in particular, achieved through the composition of the lubricant emulsion. A fact which plays an important role in this method is that the lubricant loss is extremely small because due to a corresponding selection of the spraying speed of the lubricant/gas mixture 16 the latter passes to the roll surface 12 and remains there due to metered application. As a result, less lubricant is consumed. In addition, a cooling effect is also achieved through the spraying operation, resulting in a further increase in the service life of the press rolls 1 and 2. Sintering of fine material 8 to be briquetted and sticking of the briquettes 10 inside the molding pockets 3 are excluded by such a procedure. It is here important that the spraying operation effects a very uniform wetting of the roll surface 12 by lubricants.

The metered supply of the lubricant makes it possible on the one hand that the lubricant demand can be adapted to the respective roll speed. On the other hand, the metered supply can automatically be readjusted via a control unit (depending on the sticking characteristics). Furthermore, an interval-type spraying operation is also possible.

Figure 3:
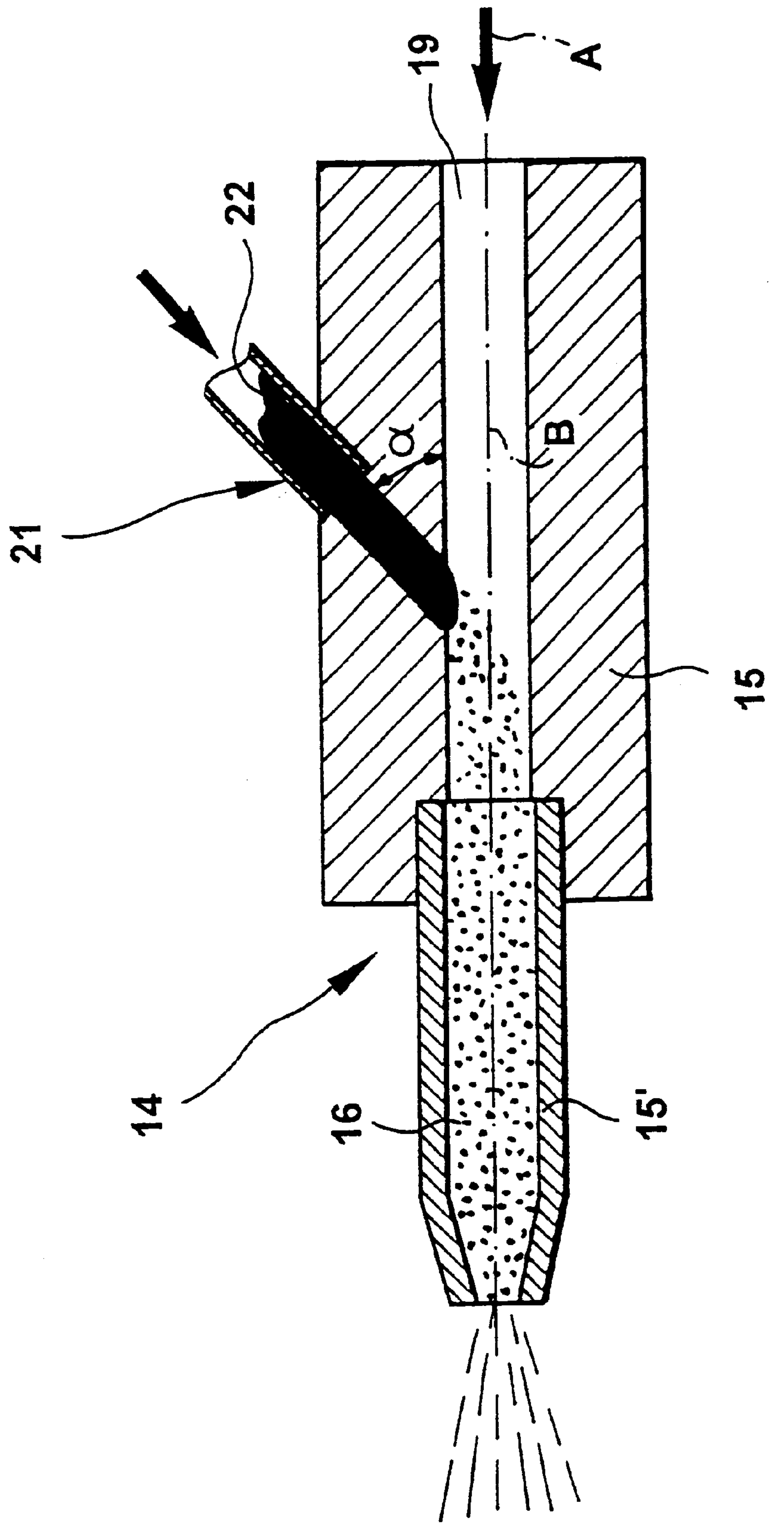
FIG. 3 schematically illustrates a direct injection means in full section.

FIG. 3 shows a nozzle means 14 in which an emulsion tube 21 is laterally guided up to tube 15, 15', with the lubricant emulsion 22 being introduced into the gas flow through the emulsion tube 21. The emulsion tube 21 has an angle α of about 45° relative to the flow direction A of the gas flow 19 and the axis B of the tube 15, respectively. The lubricant emulsion is thereby distributed in a rather simple form in the gas flow 19 for achieving the lubricant-gas mixture 16. Such an assembly can also be arranged directly in the hot region because of its compactness and simplicity.

Figure 4:
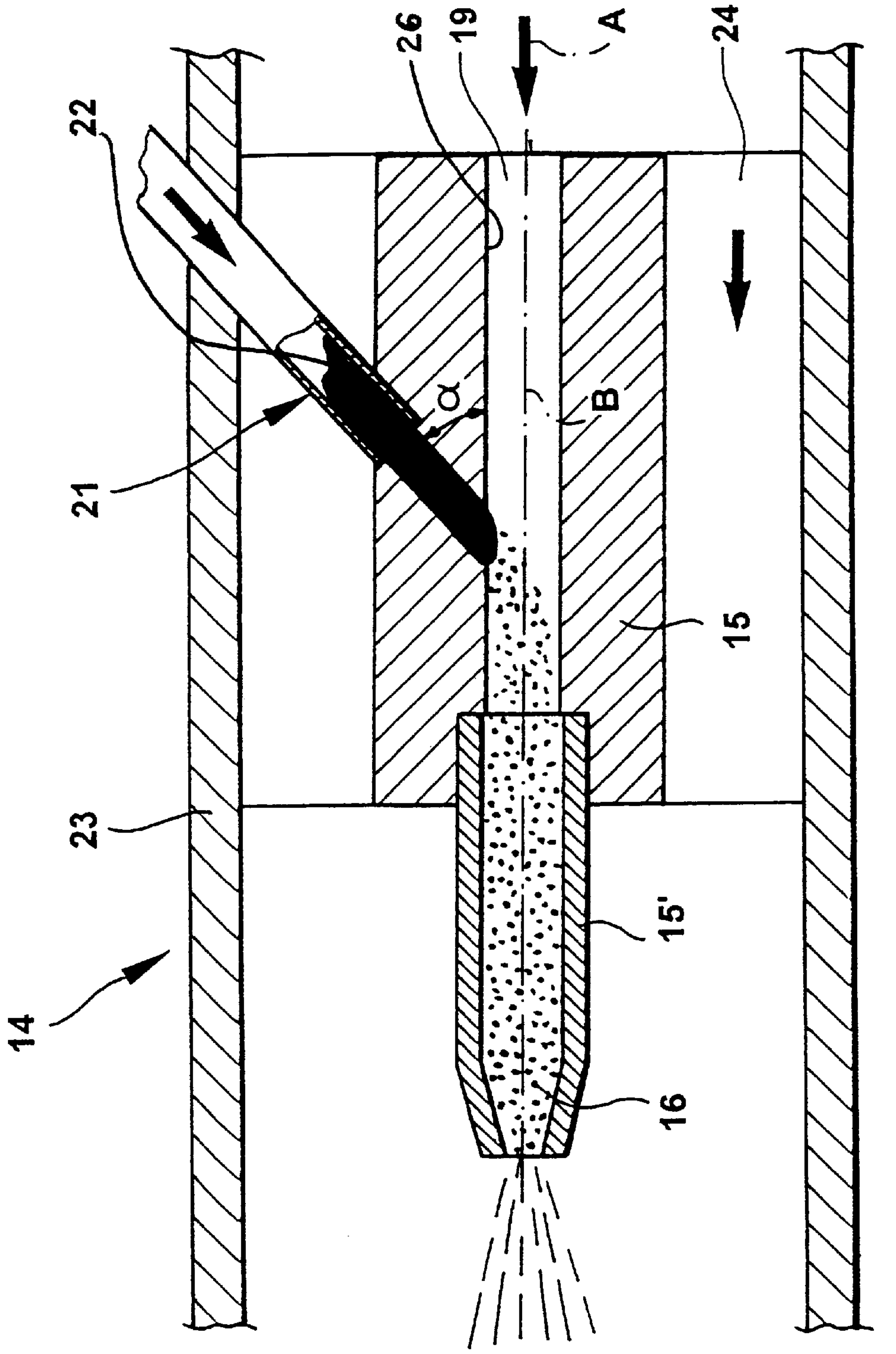
FIG. 4 schematically illustrates a combination of venturi nozzle and direct injection means in full section.

FIG. 4 shows a combination of a venturi nozzle with the nozzle means of FIG. 3. The nozzle means of FIG. 3, which is not described in more detail, is coaxially arranged in an outer nozzle tube 23 so that, except for a few fastening webs (not shown in detail), an annular passage 24 is formed between the outer nozzle tube 23 and the tube 15. Gas flow is provided through this annular passage 24 and can thus be referred to as an annular flow of gas. The annular gas flow is accelerated in this annular passage 24 because the presence of tube 15 and 15' restrict the size of the annular passage 24. The annular gas flow exits in the region of the tube 15', thereby ensuring a further swirling action. The inner gas flow 19 inside the tube 15 can also be accelerated, so that the lubricant emulsion 22 is introduced into the tube 15 by means of the emulsion 21 at a place at which the inner gas flow 19 has a very high speed. Tube 15 may be defined in this arrangement as an inner tube 15 having an interior surface 26 defining an interior passage for accommodating the gas flow 19. The inner gas flow 19 and the annular gas flow mix at the outlet of the tube 15' to form a combined flow.

What is claimed is:

1. A method for preventing the sticking of material to a briquetting roll press, said method comprising the steps of:

providing two press rolls each having molding pockets;

rotating one press roll in a clockwise direction;

rotating the other press roll at a counter clockwise direction;

feeding material to be briquetted between said press rolls, said molding pockets of said press rolls being in alignment to create a mold-shape for the material to be briquetted; and spraying a lubricant emulsion on said press rolls to prevent sticking, wherein the sprayed lubricant emulsion is atomized with a gas.

2. A method, as claimed in claim in claim 1, wherein:

a vapor barrier surrounds the roll press, and said spraying step is achieved at a spraying speed sufficient to break the vapor barrier.

3. A method, as claimed in claim 1, wherein:

the lubricant emulsion comprises a graphite powder emulsion.

4. A method, as claimed in claim 1, wherein:

the lubricant emulsion comprises 50% to 90% water and 10% to 50% of graphite powder.

5. A method, as claimed in claim 4, wherein:

binders are added to the lubricant emulsion to keep the graphite powder uniformly distributed in the emulsion.

6. A method, as claimed in claim 1, wherein:

the gas used is inert.

7. A method, as claimed in claim 1, wherein:

a hot region surrounds the roll press, and atomization of the lubricant emulsion occurs outside of the hot region.

8. A method, as claimed in claim 1, wherein:

a plurality of nozzles are used to spray the lubricant emulsion, and joint atomization occurs for each said nozzle.

9. A method, as claimed in claim 1, wherein:

0.1 to 0.3 liters per minute of lubricant emulsion are sprayed onto each roll.

10. A method, as claimed in claim 1, wherein:

the material briquetted is hot sponge iron.

11. A method for preventing the sticking of material to a briquetting roll press, said method comprising the steps of:

providing a flow of gas through a passage of a flow tube;

selectively metering a quantity of lubricant emulsion comprising 50% to 90% water and 10% to 50% of graphite powder into the flow of gas for distribution of said lubricant emulsion within the gas flow to produce a combined flow;

spraying the combined flow onto a roll surface of the briquetting roll press.

12. A method, as claimed in claim 11, wherein:

the material briquetted is hot sponge iron.

13. A method, as claimed in claim 11, wherein:

said lubricant emulsion comprises a mixture of water, graphite, and binders to evenly distribute the graphite within the water.

14. A method, as claimed in claim 11, further comprising the step of:

spraying the combined flow at a speed sufficient to break through a vapor barrier inside the roll region of the briquetting roll press.

15. A method, as claimed in claim 11, wherein:

all steps of claim 11, except said spraying step, occur outside of a hot region directly surrounding the briquetting roll press.

16. A method, as claimed in claim 11, further including the step of:

spraying the combined flow onto roll surfaces of the briquetting roll press through a plurality of nozzles in communication with the combined flow.

17. A method, as claimed in claim 11, wherein:

about 0.1 to 0.3 liters per minute of lubricant emulsion from the combined flow is sprayed onto each briquetting roll.

18. A method, as claimed in claim 11, further including the step of:

metering the emulsion through an emulsion tube in communication with the flow tube, the emulsion tube extending along an angle relative to a flow direction of the combined flow within the flow tube.

19. A method, as claimed in claim 18, wherein:

the angle is about 45°.

20. A method for preventing the sticking of material to a briquetting roll press, said method comprising the steps of:

providing an annular flow of gas through an annular passage of an outer nozzle tube;

providing an inner tube disposed within said annular passage, said inner tube having an interior passage;

providing an inner flow of gas through said interior passage of said inner tube;

selectively metering a quantity of lubricant emulsion into the inner flow of gas to produce a mixture of lubricant and gas within the inner flow;

causing the mixture of lubricant and gas to flow out of the inner tube and into communication with the annular passage of the outer nozzle tube;

mixing the mixture of lubricant and gas of the inner flow with the annular flow of gas of the outer nozzle tube to produce an atomized mixture of lubricant and gas in a combined flow; and spraying the combined flow onto a roll surface of the briquetting roll press.

21. A method, as claimed in claim 20, wherein:

said lubricant emulsion comprises a mixture of water and graphite.

22. A method, as claimed in claim 21, wherein:

the water and graphite mixture is a ratio of about 7 parts to 3 parts, respectively.

23. A method, as claimed in claim 20, wherein:

said lubricant emulsion comprises a mixture of water, graphite, and binders to evenly distribute the graphite within the water.

24. A method, as claimed in claim 20, further comprising the step of:

spraying the combined flow at a speed sufficient to break through a vapor barrier inside a roll region of the briquetting roll press.

25. A method, as claimed in claim 20, wherein:

said lubricant emulsion comprises 50% to 90% water, and 10% to 50% graphite powder.

26. A method, as claimed in claim 20, wherein:

all steps of claim 20, except said spraying step, occur outside of a hot region directly surrounding the briquetting roll press.

27. A method, as claimed in claim 20, further including the step of:

spraying the combined flow onto roll surfaces of the briquetting roll press through a plurality of nozzles in communication with the combined flow.

28. A method, as claimed in claim 20, wherein:

about 0.1 to 0.3 liters per minute of lubricant emulsion from the combined flow is sprayed onto each briquetting roll.

29. A method, as claimed in claim 20, wherein:

said inner flow and said annular flow are coaxially arranged along a common axis.

30. A method, as claimed in claim 20, further including the step of:

metering the lubricant emulsion through an emulsion tube in communication with the inner tube, the emulsion tube extending along an angle relative to a flow direction of the inner flow.

31. A method, as claimed in claim 20, wherein:

the angle is about 45°.

32. A method, as claimed in claim 20, wherein:

the gas used is inert.

* * * * *